US012586823B2

(12) United States Patent
Kimura et al.

(10) Patent No.: US 12,586,823 B2
(45) Date of Patent: Mar. 24, 2026

(54) PROTECTING DEVICE AND BATTERY PACK

(71) Applicant: DEXERIALS CORPORATION, Tokyo (JP)

(72) Inventors: Yuji Kimura, Tochigi (JP); Chisato Komori, Tochigi (JP); Koichi Mukai, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 1159 days.

(21) Appl. No.: 17/414,626

(22) PCT Filed: Oct. 25, 2019

(86) PCT No.: PCT/JP2019/041901
§ 371 (c)(1),
(2) Date: Jun. 16, 2021

(87) PCT Pub. No.: WO2020/129406
PCT Pub. Date: Jun. 25, 2020

(65) Prior Publication Data
US 2022/0069367 A1 Mar. 3, 2022

(30) Foreign Application Priority Data

Dec. 19, 2018 (JP) .................................. 2018-237413

(51) Int. Cl.
*H01H 37/36* (2006.01)
*H01H 37/76* (2006.01)
(Continued)

(52) U.S. Cl.
CPC ........ *H01M 10/4235* (2013.01); *H01H 37/76* (2013.01); *H01H 61/02* (2013.01);
(Continued)

(58) Field of Classification Search
CPC ............. H01M 10/4235; H01M 10/48; H01M 2200/10; H01H 37/76; H01H 61/02; H01H 85/06
(Continued)

(56) References Cited

U.S. PATENT DOCUMENTS

| | | | | | |
|---|---|---|---|---|---|
| 5,179,436 | A | * | 1/1993 | Asdollahi | .......... H01H 85/0417 337/203 |
| 5,287,079 | A | * | 2/1994 | Bernardi | ............ H01H 85/0417 337/250 |

(Continued)

FOREIGN PATENT DOCUMENTS

| | | |
|---|---|---|
| CN | 105453211 A | 3/2016 |
| JP | 2015-053260 A | 3/2015 |

(Continued)

OTHER PUBLICATIONS

Mar. 16, 2024, Chinese Office Action issued for related CN Application No. 201980083793.9.

(Continued)

*Primary Examiner* — Anatoly Vortman

(74) *Attorney, Agent, or Firm* — Paratus Law Group, PLLC

(57) ABSTRACT

Provided are a protecting device and a battery pack capable of preventing floating of a blowout member, preventing deformation of a meltable conductor, and maintaining predetermined current capacity and blowout properties. The protecting device 1 includes: a meltable conductor 2; and a blowout member 4 connected to one surface of the meltable conductor 2, wherein the blowout member 4 includes: an insulating substrate 3; and a deformation suppressing electrode 5 formed on a front surface 3a connected to the meltable conductor 2 of the insulating substrate 3 and (Continued)

connected to the meltable conductor 2 to suppress deformation of the meltable conductor 2.

10 Claims, 15 Drawing Sheets

(51) Int. Cl.
    *H01H 61/02*     (2006.01)
    *H01H 85/06*     (2006.01)
    *H01M 10/42*     (2006.01)
    *H01M 10/48*     (2006.01)

(52) U.S. Cl.
    CPC ............ *H01H 85/06* (2013.01); *H01M 10/48* (2013.01); *H01M 2200/10* (2013.01)

(58) Field of Classification Search
    USPC .......................................................... 337/298
    See application file for complete search history.

(56)           References Cited

U.S. PATENT DOCUMENTS

| | | | | | |
|---|---|---|---|---|---|
| 6,542,063 | B2 * | 4/2003 | Kawashima | ....... | H01H 85/0417 337/186 |
| 6,762,670 | B1 * | 7/2004 | Yen | ........................ | H01H 85/43 337/203 |
| 8,547,195 | B2 * | 10/2013 | Kimura | ............. | H01M 10/4235 337/267 |
| 8,648,688 | B2 * | 2/2014 | Kimura | .................. | H01H 37/08 337/182 |
| 8,803,652 | B2 * | 8/2014 | Kimura | ................ | H01H 37/761 337/186 |
| 10,600,602 | B2 * | 3/2020 | Yoneda | .................. | H01H 85/06 |
| 11,791,116 | B2 * | 10/2023 | Kimura | .............. | H01H 85/0039 337/401 |
| 11,804,347 | B2 * | 10/2023 | Kimura | ................ | H01M 10/482 |
| 2009/0102595 | A1 * | 4/2009 | Pachla | ................. | H01H 85/046 337/297 |
| 2014/0340046 | A1 * | 11/2014 | Komori | .............. | H01H 85/0241 320/134 |
| 2015/0048922 | A1 * | 2/2015 | Kimura | ............... | H01M 50/581 337/401 |
| 2015/0145637 | A1 * | 5/2015 | Nitta | .................. | H01H 85/0052 337/184 |
| 2016/0049272 | A1 * | 2/2016 | Komori | ................ | H01H 37/761 337/416 |
| 2016/0071680 | A1 * | 3/2016 | Mukai | .................. | H01H 37/761 337/183 |
| 2017/0236665 | A1 * | 8/2017 | Furuuchi | .............. | H01H 85/046 337/414 |
| 2017/0236667 | A1 * | 8/2017 | Furuuchi | .............. | H01H 37/761 327/525 |
| 2018/0294124 | A1 * | 10/2018 | Chen | ................... | H01M 10/425 |
| 2018/0294126 | A1 * | 10/2018 | de Leon | .............. | H01H 85/175 |

FOREIGN PATENT DOCUMENTS

| | | | |
|---|---|---|---|
| JP | 2015-228302 | A | 12/2015 |
| TW | 201523679 | A | 6/2015 |
| WO | WO 2015/020111 | A1 | 2/2015 |

OTHER PUBLICATIONS

Mar. 15, 2023, Taiwanese Office Action issued for related TW Application No. 108147868.
Mar. 24, 2023, Korean Office Action issued for related KR Application No. 10-2021-7018503.

* cited by examiner

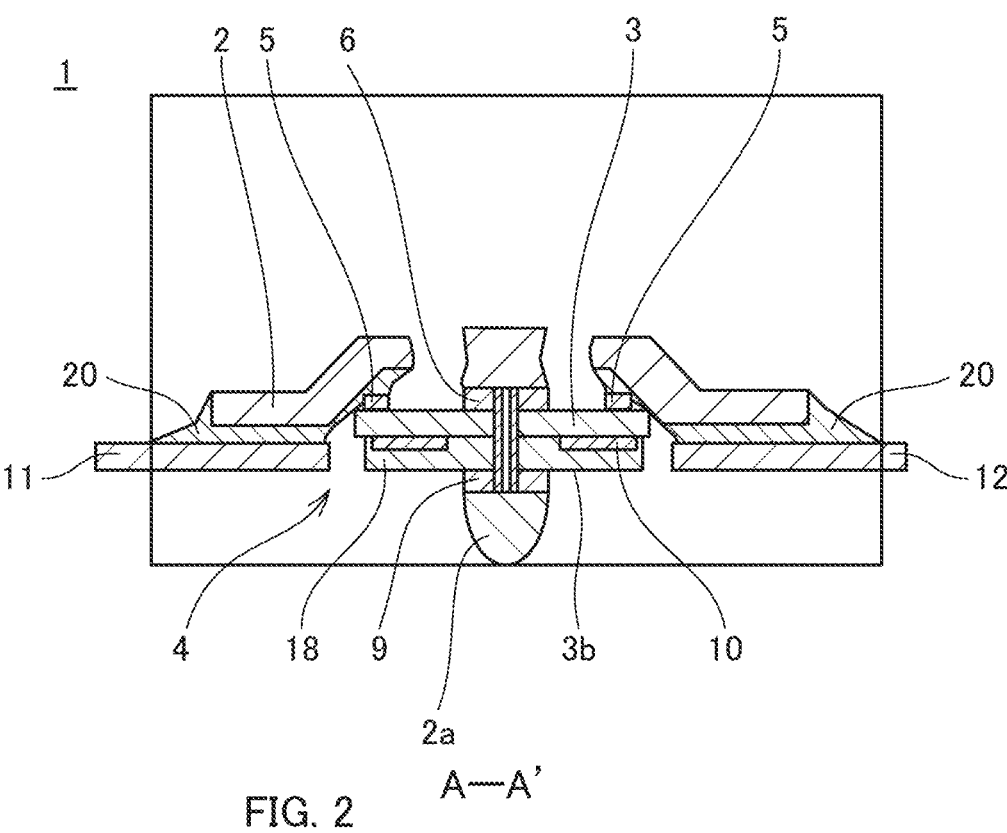
FIG. 2     A—A'
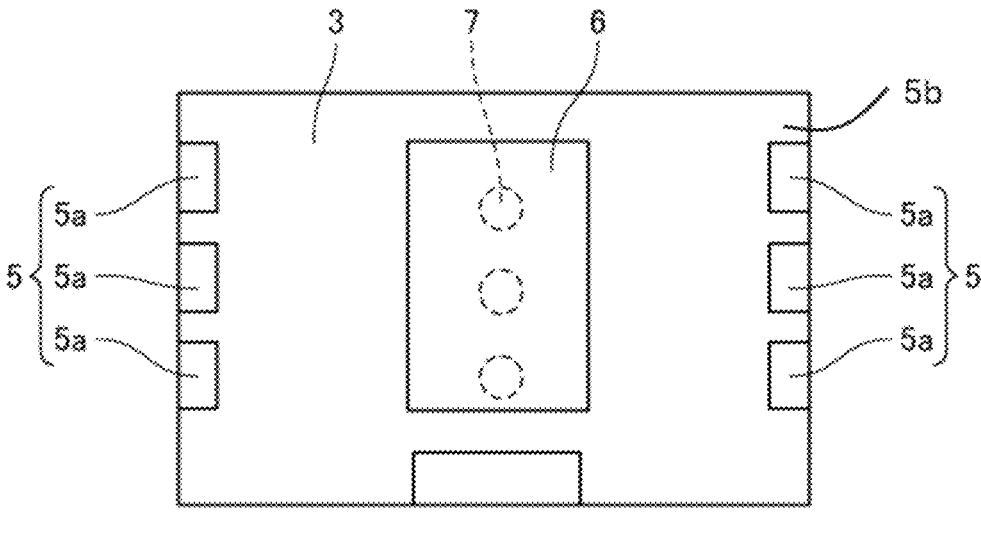
FIG. 3

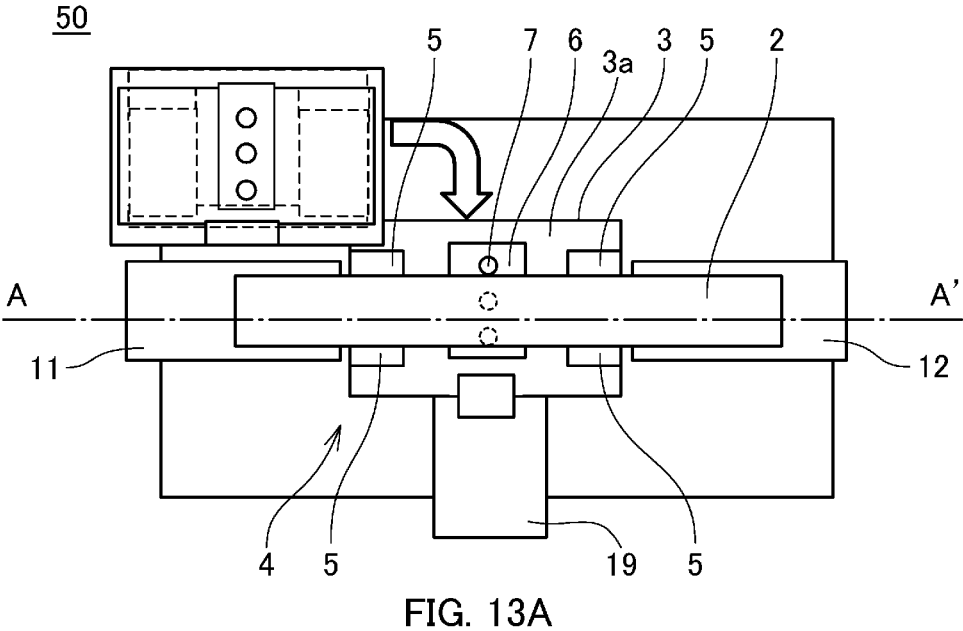
FIG. 13A
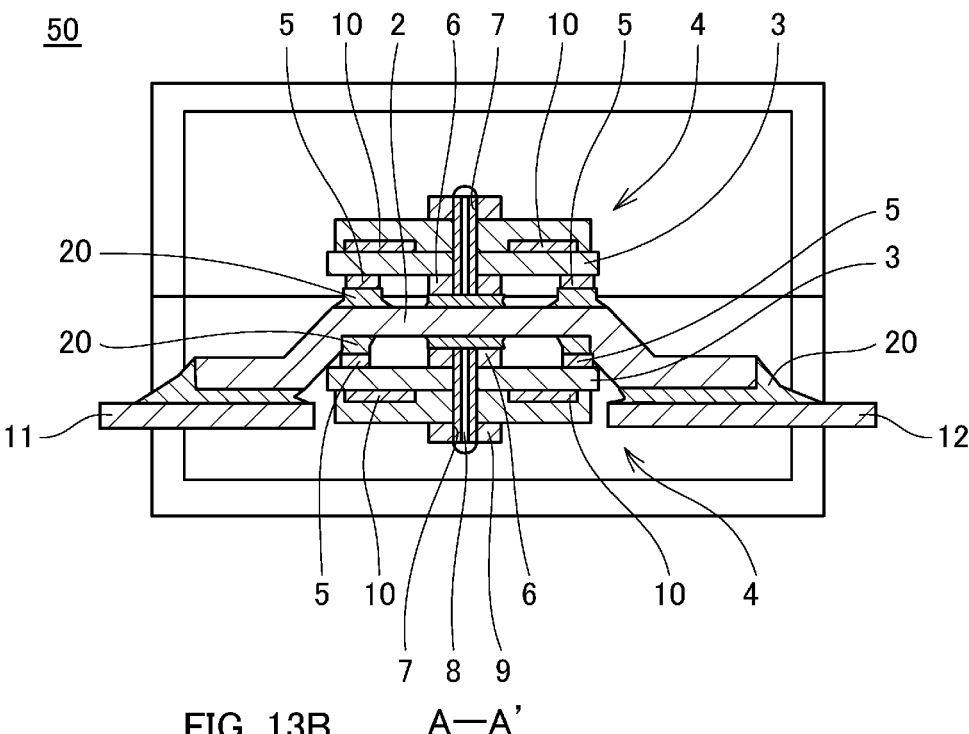
FIG. 13B      A—A'

A—A'

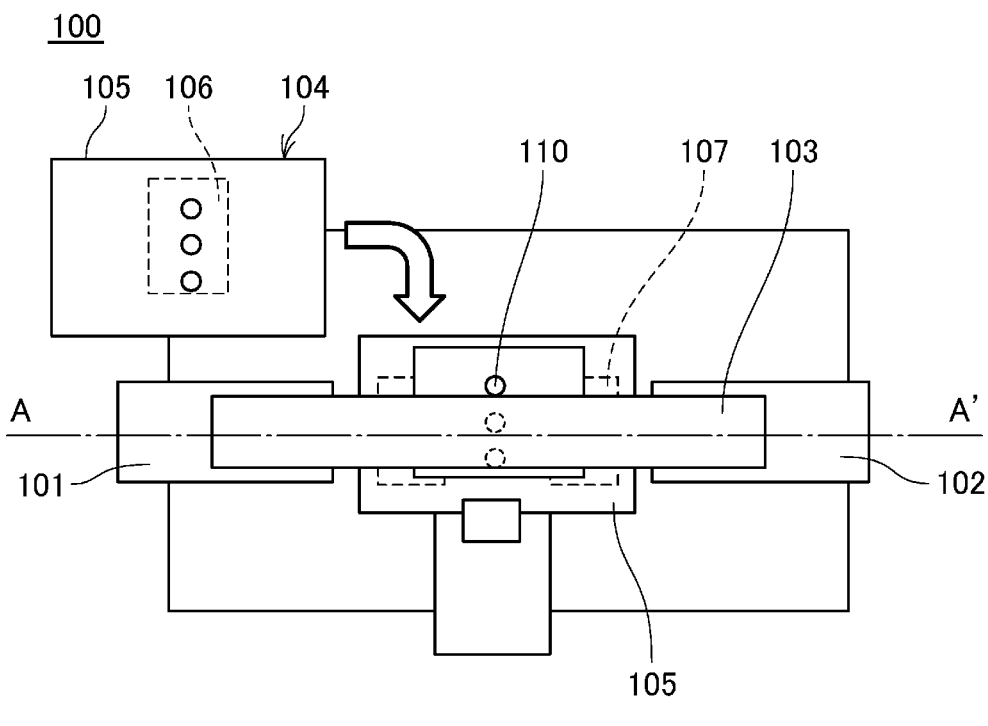
FIG. 16A
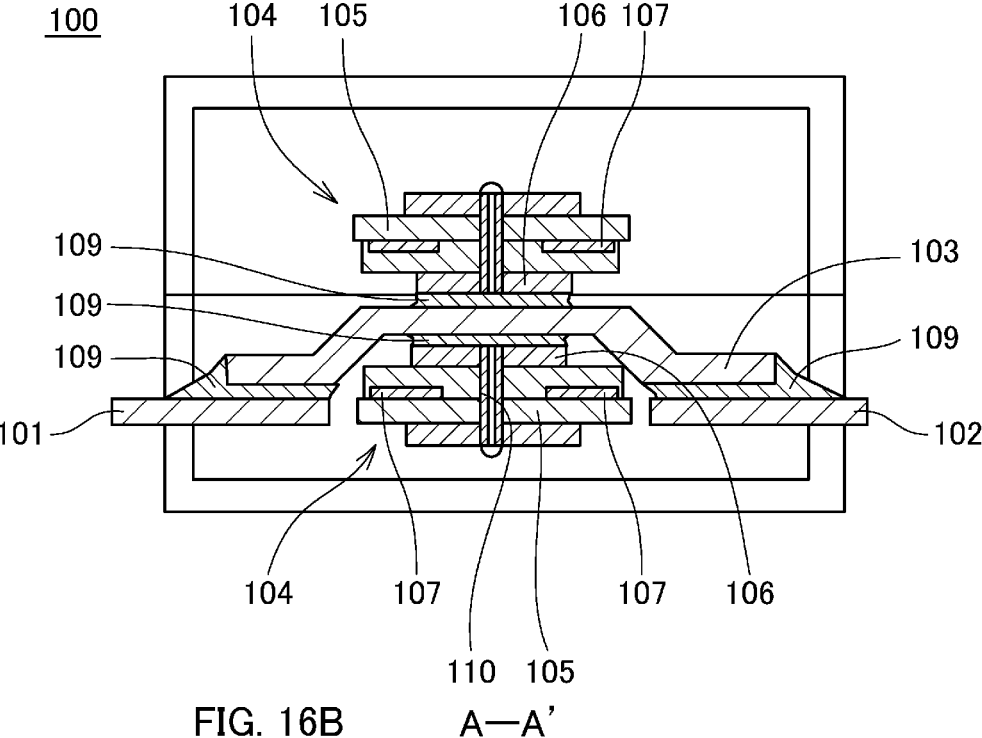
FIG. 16B       A—A'

A—A'

PROTECTING DEVICE AND BATTERY PACK

TECHNICAL FIELD

The present technology relates to a protecting device and a battery pack for protecting a circuit connected in a current path by melting and blowing a meltable conductor provided in the current path, thereby interrupting the current path. This application is a National Stage Patent Application of PCT International Patent Application No. PCT/JP2019/041901 filed Oct. 25, 2019 under 35 U.S.C. § 371, Which claims priority based on Japanese Patent Application No. 2018-237413 filed Dec. 19, 2018 in Japan, which are all incorporated herein by reference.

BACKGROUND ART

Many secondary batteries that can be charged and reused are provided to users in the form of battery packs. In particular, in order to protect users and electronic appliances, lithium ion secondary batteries having a high volumetric energy density typically include several protective circuits incorporated in battery packs for over-charging protection and over-discharging protection to interrupt the output of the battery pack under predetermined conditions.

Many electronic devices using lithium ion secondary batteries use an FET switch incorporated in a battery pack to turn ON/OFF the output, for over-charging protection or over-discharging protection of the battery pack. However, even when the FET switch is short-circuited and damaged for some reason, the battery pack or the electronic appliance should still work to prevent accidents, including fire, among other things, even if it encounters a large current caused by a surge, such as a momentary lighting strike, or an abnormally decreased output voltage occurring in an aged battery cell, or an excessively high output voltage. For this reason, a protecting device is used having a fuse element which interrupts a current path in accordance with an external signal so as to safely interrupt the output of the battery cell under these possible abnormalities.

As a protecting device of such a protective circuit for a lithium ion secondary battery, a structure is used in which a heat-generating element is provided inside the protecting device and a meltable conductor in a current path is blown by heat generation of the heat-generating element.

PRIOR ART REFERENCE

Patent Reference

Patent Document 1: Japanese Unexamined Patent Application Publication No. 2015-53260

SUMMARY OF THE INVENTION

Problem to be Solved by the Invention

Applications of lithium-ion secondary batteries have expanded in recent years, and they are being considered for use in larger current applications, such as electric power tools including electric drivers, and transportation equipment including hybrid cars, electric vehicles, and power-assisted bicycles, with the use of some having already begun. In these applications, particularly at startup, a large current exceeding several tens to 100 A may flow. It is desired to implement a protecting device compatible with such a large current capacity.

In order to implement a protecting device compatible with such a large current, a protecting device has been proposed in which a meltable conductor having an increased cross-sectional area is used, and an insulating substrate having a heat-generating element formed thereon is connected to a surface of the meltable conductor.

FIGS. 16A and 16B are views illustrating an example of a protecting device assuming a large-current application. The protecting device 100 shown in FIG. 16, constitutes a part of an external circuit such as a battery charge/discharge circuit by connecting a meltable conductor 103 between first and second external connection electrodes 101, 102 provided in the external circuit, and when an abnormality such as an overvoltage occurs, the meltable conductor 103 melts to interrupt the current path between the first external connection electrode 101 and the second external connection electrode 102.

The protecting device 100 includes: the meltable conductor 103 connected between the first and second external connection electrodes 101, 102; and a blowout member 104 connected to the meltable conductor 103 and provided with a heat-generating element for heating and melting the meltable conductor 103. The blowout member 104 includes: an insulating substrate 105 arranged between the first and second external connection electrodes 101, 102; a front surface electrode 106 formed on the front surface of the insulating substrate 105 and connected to a part of the meltable conductor 103; a heat-generating element 107 provided on the insulating substrate 105; and a through hole 110 provided in the thickness direction of the insulating substrate 105 and continuous with the front surface electrode 106.

A conductive layer is formed inside the through hole 110, and when the meltable conductor 103 melts, the melted conductor of the meltable conductor 103 is sucked by capillary phenomenon. Even when the amount of melting is increased by increasing the cross-sectional area of the meltable conductor 103 in order to cope with a large current application, the protecting device 100 can reduce the volume of the melted conductor by sucking the melted conductor into the through hole 110, thereby reducing scattering of the melted conductor at the time of blowout, preventing a reduction in insulation resistance, and preventing a short-circuit failure due to adhesion of the meltable conductor 103 to the peripheral circuit at the mounting position.

The meltable conductor 103 is connected to the first and second external connection electrodes 101, 102 and the front surface electrode 106 by a bonding material such as solder 109. When the protecting device 100 is mounted on an external circuit board using a reflow furnace, it may not be possible to fix the blowout member 104 a predetermined position because it may rotate or tilt, as shown in FIG. 17, because the bonding solder 109 may melt and float on the front surface electrode 106 in an attempt to stably aggregate. In addition, since the meltable conductor 103 is also softened by the reflow heating, if the blowout member 104 becomes unstable due to the floating of the melted bonding solder 109, pressure from the melted bonding solder 109 might be applied unevenly to the softened meltable conductor 103, thereby causing deformation.

When the meltable conductor 103 is deformed, the resistance of the protecting device 100 may vary, which may cause problems such as a not having a predetermined current capacity or not having predetermined blowout properties.

Accordingly, it is an object of the present technology to provide a protecting device and a battery pack capable of preventing floating of the blowout member, preventing deformation of the meltable conductor, and maintaining a predetermined current capacity and blowout properties.

Means of Solving the Problem

In order to solve the above problems, a protecting device according to the present technology includes: a meltable conductor; and a blowout member connected to one surface of the meltable conductor, wherein the blowout member includes an insulating substrate and a deformation suppressing electrode formed on a front surface, which is to be connected to the meltable conductor, of the insulating substrate and connected to the meltable conductor to suppress deformation of the meltable conductor.

Further, a protecting device according to the present technology includes: a meltable conductor; a first blowout member connected to one surface of the meltable conductor; and a second blowout member connected to the other surface of the meltable conductor, wherein the first blowout member includes a first insulating substrate and a first deformation suppressing electrode formed on a front surface, which is to be connected to the meltable conductor, of the first insulating substrate and connected to the meltable conductor to suppress deformation of the meltable conductor, and wherein the second blowout member includes a second insulating substrate and a second deformation suppressing electrode formed on a front surface, which is to be connected to the meltable conductor, of the second insulating substrate and connected to the meltable conductor to suppress deformation of the meltable conductor.

Further, a battery pack according to the present technology includes: one or more battery cells; a protecting device connected to a charge/discharge path of the battery cell and capable of interrupting the charge/discharge path; and a current controlling element for detecting a voltage value of the battery cell and controlling the energization of the protecting device, the protecting device including: a meltable conductor connected in the charge/discharge path; and a blowout member connected to one surface of the meltable conductor, wherein the blowout member includes an insulating substrate and a deformation suppressing electrode formed on a surface, which is to be connected to the meltable conductor, of the insulating substrate and is connected to the meltable conductor to suppress deformation of the meltable conductor, and wherein the charge/discharge path is interrupted by melting the meltable conductor.

Further, a battery pack according to the present technology includes: one or more battery cells; a protecting device connected to a charge/discharge path of the battery cell and capable of interrupting the charge/discharge path; and a current controlling element for detecting the voltage value of the battery cell and controlling the energization of the protecting device, the protecting device including: a meltable conductor connected in the charge/discharge path; a first blowout member connected to one surface of the meltable conductor; and a second blowout member connected to the other surface of the meltable conductor, wherein the first blowout member includes a first insulating substrate and a first deformation suppressing electrode formed on a front surface, which is to be connected to the meltable conductor, of the first insulating substrate and is connected to the meltable conductor to suppress deformation of the meltable conductor, wherein the second blowout member includes a second insulating substrate and a second deformation suppressing electrode formed on a front surface, which is to be connected to the meltable conductor, of the second insulating substrate and is connected to the meltable conductor to suppress deformation of the meltable conductor, and wherein the charge/discharge path is interrupted by melting the meltable conductor.

Effects of the Invention

According to this technology, when the blowout member is exposed to a high temperature environment, such as when the blowout member is reflow-heated for connecting the blowout member to the meltable conductor or mounting the protecting device on an external circuit board, the deformation suppressing electrode radiates heat from the meltable conductor to the insulating substrate side, thereby preventing deformation of the meltable conductor which could otherwise occur because of heat accumulation. In addition, the deformation suppressing electrode limits the floating region of the connecting material that has been softened to a liquid state by heating through exposure to a high temperature environment, such as reflow mounting. As a result, it is possible to prevent the insulating substrate from fluctuating and the meltable conductor from being deformed due to the floating of the softened connecting member.

BRIEF DESCRIPTION OF THE DRAWINGS

FIG. 1 illustrates a protecting device according to the present technology, in which

FIG. 2 is a cross-sectional view illustrating a protecting device according to the present technology shown in FIG. 1 showing a state in which the meltable conductor is blown.

FIG. 3 is a plan view illustrating a configuration example of a deformation suppressing electrode provided on an insulating substrate.

FIG. 6 illustrates an insulating substrate having heat radiation electrodes formed on the side surface thereof, in which

FIG. 7 illustrates an insulating substrate having heat radiation electrodes formed on the side and back surfaces thereof, in which

FIG. 8 illustrates an insulating substrate having heat radiation electrodes and through holes formed thereon and therethrough, in which

FIG. 9 illustrates an insulating substrate having heat radiation electrodes, side through holes, and through holes formed thereon and therethrough, in which FIG. 9A is a plan view illustrating the front surface of the insulating substrate.

FIG. 13 illustrates a protecting device having a plurality of blowout members, in which FIG. 13A is a plan view without a case member, and FIG. 13B is a cross-sectional view.

FIG. 16 illustrates an example of a protecting device for a high-current application, in which FIG. 16A is a plan view without a case member, and FIG. 16B is a cross-sectional view.

MODE FOR CARRYING OUT THE INVENTION

Figure 1A:
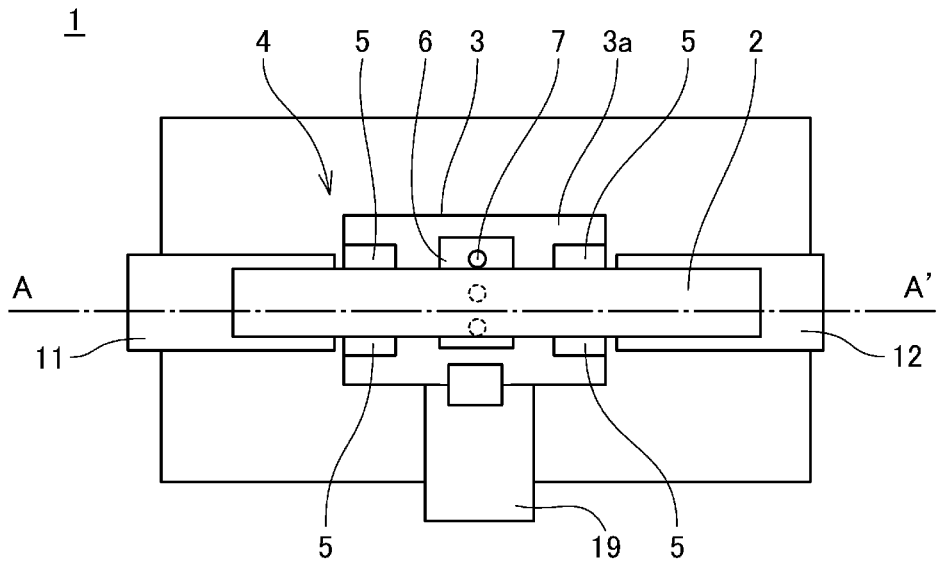
FIG. 1A is a plan view without a case member.

Embodiments of a protecting device and a battery pack according to the present invention will now be more particularly described with reference to the accompanying drawings. It should be noted that the present invention is not limited to the embodiments described below and various modifications can be added to the embodiment without departing from the scope of the present invention. The features shown in the drawings are illustrated schematically and are not intended to be drawn to scale. Actual dimensions should be determined in consideration of the following description. Moreover, those skilled in the art will appreciate that dimensional relations and proportions may be different among the drawings in some parts.

First Embodiment

Figure 1B:
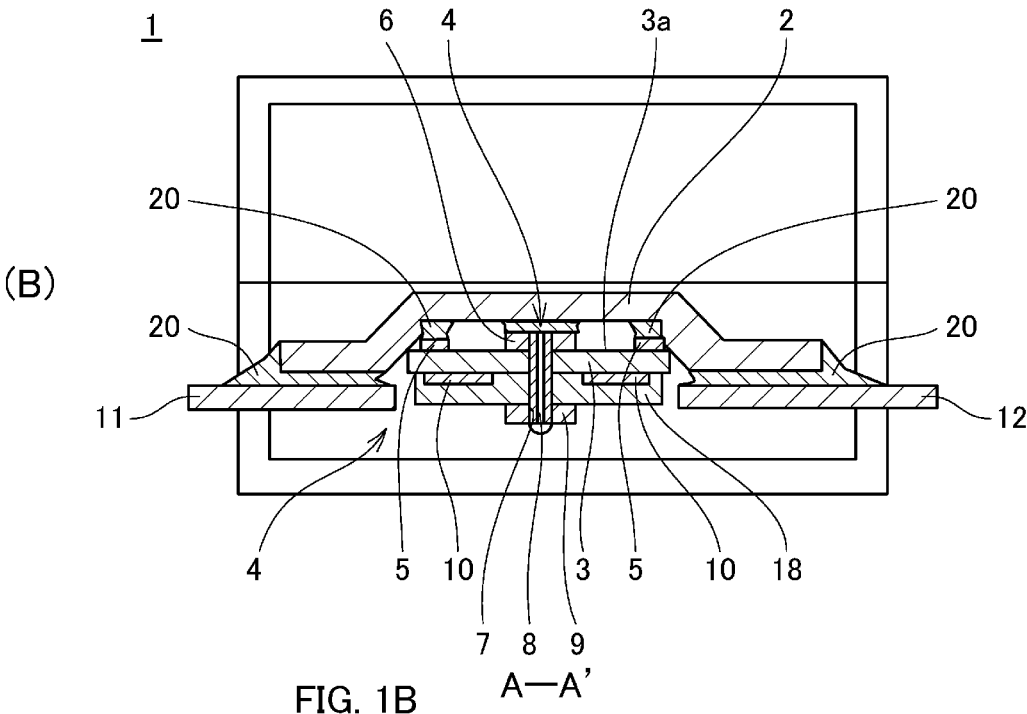
FIG. 1B is a cross-sectional view.

As shown in FIGS. 1A and 1B, a protecting device 1 according to the present technology includes a meltable conductor 2 and a blowout member 4 connected to one surface of the meltable conductor 2. The blowout member 4 includes an insulating substrate 3 connected to one surface of the meltable conductor 2, and a deformation suppressing electrode 5 formed on a front surface 3*a* of the insulating substrate 3, which is to be connected to the meltable conductor 2, and connected to the meltable conductor 2 to suppress deformation of the meltable conductor 2. The protecting device 1 is incorporated in an external circuit so that the meltable conductor 2 forms a part of the current path of the external circuit, and the current path is interrupted by heat generation of the heat-generating element 10 described later or overcurrent exceeding the protection rating.

The insulating substrate 3 is formed from an insulating member, such as alumina, glass ceramics, mullite, and zirconia. Alternatively, the insulating substrate 3 may be made from a material used for a printed wiring board, such as a glass epoxy substrate or a phenol substrate.

On the front surface 3*a* of the insulating substrate 3, there is formed a front surface electrode 6 to which the meltable conductor 2 is connected and on which, when the meltable conductor 2 melts, the melted conductor 2*a* aggregates. The front surface electrode 6 is connected to the meltable conductor 2 through a bonding material such as a connection solder 20.

The front surface electrode 6 may be formed containing a suction hole 7. When the meltable conductor 2 melts, the suction hole 7 sucks the melted conductor 2*a* by a capillary phenomenon, thereby reducing the volume of the melted conductor 2*a* held on the front surface electrode 6 (see FIG. 2). Even when the amount of melting is increased by increasing the cross-sectional area of the meltable conductor 2 of the protecting device 1 in order to provide for use in large current applications, the volume of the melted conductor 2*a* present can be reduced by sucking the melted conductor 2*a* into the suction hole 7. Thus, the protecting device 1 can reduce scattering of the melted conductor 2*a* that would result due to arc discharge generated when the meltable conductor 2 is blown, prevent lowering of insulation resistance, and prevent short-circuit failure due to adhesion of the meltable conductor 2 to the peripheral circuit around the mounting position.

The inner surface of the suction hole 7 is formed with a conductive layer 8. By forming the conductive layer 8 thereon, the suction hole 7 can easily suck the melted conductor 2*a*. The conductive layer 8 is formed from, for example, any one of copper, silver, gold, iron, nickel, palladium, lead, and tin, or an alloy containing any one of them as a main component, and can be formed on the inner surface of the suction hole 7 by a known method such as electrolytic plating or printing a conductive paste. The conductive layer 8 may be formed by inserting a plurality of metal wires or an aggregate of conductive ribbons into the suction hole 7.

The suction hole 7 is preferably formed as a through hole penetrating the insulating substrate 3 in the thickness direction. As a result, the suction hole 7 can suck the melted conductor 2*a* to the back surface 3*b* side of the insulating substrate 3, thereby sucking a larger amount of the melted conductor 2*a* to reduce the volume of the melted conductor 2*a* present at the blowout portion. The suction hole 7 may be formed as a non-through hole.

The conductive layer 8 of the suction hole 7 is continuous with the front surface electrode 6 formed on the front surface 3*a* of the insulating substrate 3. Since the front surface electrode 6 supports the meltable conductor 2 and the melted conductor 2*a* aggregates thereon, by making the front surface electrode 6 and the conductive layer 8 continuous, the melted conductor 2*a* can be easily guided into the suction hole 7.

On the back surface 3*b* of the insulating substrate 3, there is formed a back surface electrode 9 connected to the conductive layer 8 of the suction hole 7. The back surface electrode 9 is connected to the conductive layer 8, so that when the meltable conductor 2 melts, the melted conductor 2*a* that has moved through the suction hole 7 aggregates (see FIG. 2). As a result, the protecting device 1 can suck more of the melted conductor 2*a* and reduce the volume of the melted conductor 2*a* at the blowout portion.

By forming a plurality of suction holes 7 in the protecting device 1, the number of paths for sucking the melted conductor 2*a* of the meltable conductor 2 can be increased, thereby sucking more of melted conductor 2*a* to further reduce the volume of melted conductor 2*a* present at the blowout portion.

Deformation Suppressing Electrode

On the front surface 3a of the insulating substrate 3, a deformation suppressing electrode 5 for suppressing deformation of the meltable conductor 2 is formed. The deformation suppressing electrode 5 is connected to the meltable conductor 2 through a bonding material such as the connection solder 20. When the blowout member 4 is exposed to a high temperature environment, such as when the blowout member 4 is reflow-heated for connecting the blowout member 4 and the meltable conductor 2 or for mounting the protecting device 1 on an external circuit board, the deformation suppressing electrode 5 radiates heat from the meltable conductor 2 to the insulating substrate 3 side, thereby preventing deformation the meltable conductor 2 that would otherwise result from heat accumulation.

In addition, the deformation suppressing electrode 5 limits the floating region of the connection solder 20 when the solder is softened to a liquid state by heating whvia exposure to a high temperature environment, such as reflow mounting. As a result, it is possible to prevent the insulating substrate 3 from fluctuating and the meltable conductor 2 from being deformed due to the floating of the softened connection solder.

Figure 4:
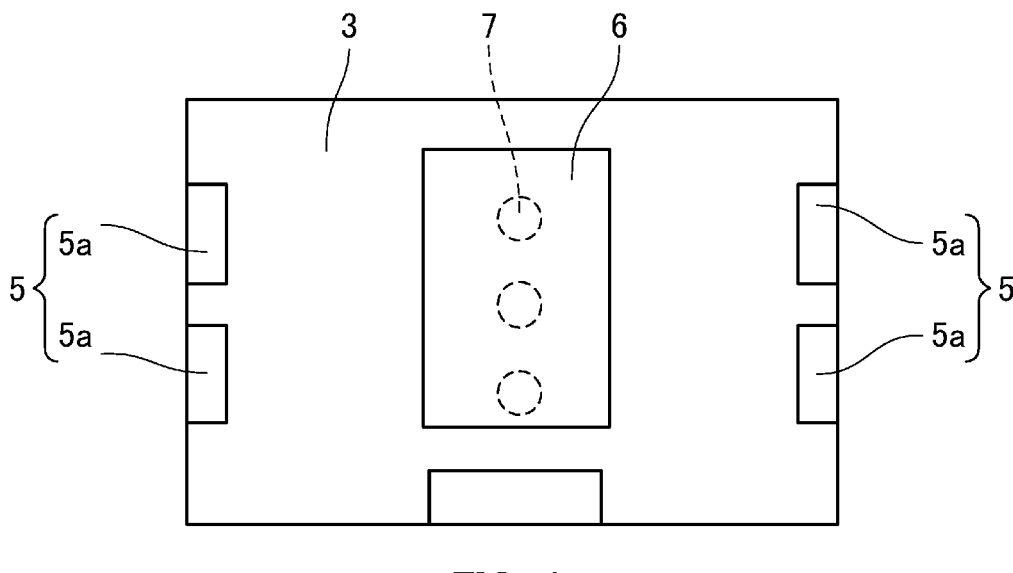
FIG. 4 is a plan view illustrating a configuration example of a deformation suppressing electrode provided on an insulating substrate.
Figure 5:
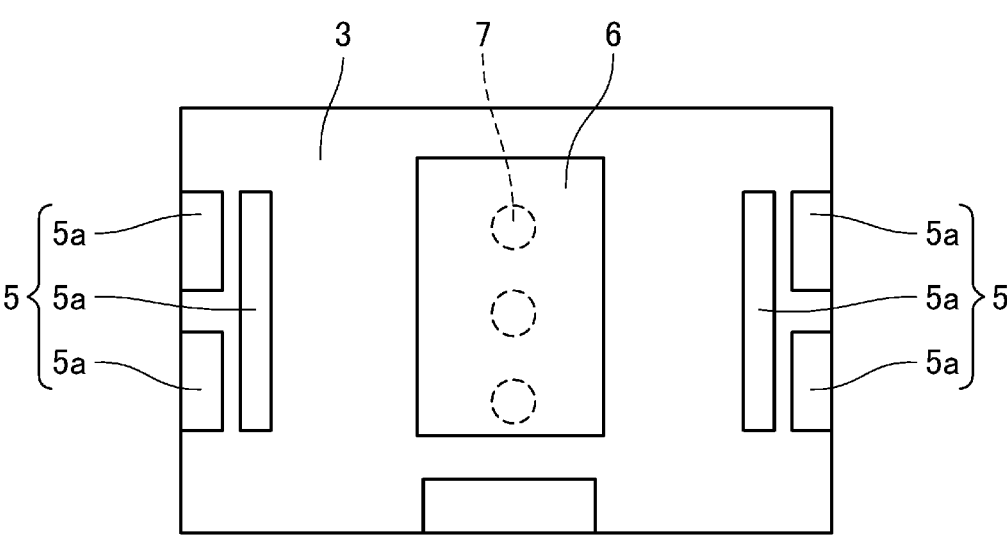
FIG. 5 is a plan view illustrating a configuration example of a deformation suppressing electrode provided on an insulating substrate.

The deformation suppressing electrode 5 is connected to a part of the meltable conductor 2 through the connection solder 20, thereby radiating heat from the meltable conductor 2 and preventing the fluctuation of the insulating substrate 3. For this reason, as shown in FIGS. 3 to 5, it is preferable that a plurality of small electrodes 5a are formed in the connection portion 5b of the deformation suppressing electrode 5 with the meltable conductor 2. By forming the plurality of small electrodes 5a, the deformation suppressing electrodes 5 are formed as a set of small electrodes 5a each having a small area at the connection portion 5b, so that the contact area with the meltable conductor 2 is secured substantially as large as that of one large area electrode, and the floating region of the softened connection solder 20 is limited within the area of each small electrode 5a of the deformation suppressing electrodes 5 having a small area. Therefore, the deformation suppressing electrode 5 can suppress the floating of the connection solder 20 and suppress the fluctuation of the insulating substrate 3 with respect to the meltable conductor 2 while maintaining the heat radiation properties of the meltable conductor 2.

Here, the connection portion 5b between the deformation suppressing electrode 5 and the meltable conductor 2 refers to a portion where a plurality of small electrodes 5a are provided adjacently so as to be regarded as being present collectively, for example, as shown in FIGS. 3 to 5, a portion where each of the two or three small electrodes 5a is arranged adjacently on both sides of the front surface electrode 6 so as to be regarded as being present collectively in one place. By forming the deformation suppressing electrode with the plurality of small electrodes 5a at the connection portion 5b with the meltable conductor 2, the area of each of the small electrodes 5a can be reduced, thereby limiting the floating region of the softened connection solder 20.

The area of each small electrode 5a and the distance from the adjacent small electrode 5a are required to be large enough to hold the connection solder 20 softened in a liquid state but not to be connected with the connection solder 20 of the adjacent small electrode 5a, and are appropriately designed according to the size and shape of the meltable conductor 2 and the insulating substrate 3, the coating amount of the connection solder 20, and the like.

As shown in FIG. 3, the deformation suppressing electrode 5 is preferably formed on the outer peripheral side of the insulating substrate 3. The meltable conductor 2 is mounted across a pair of opposing side edges of the front surface 3a of the insulating substrate 3, and is connected to the front surface electrode 6 provided substantially at the center of the front surface 3a. Therefore, the insulating substrate 3 can be reliably connected along the longitudinal direction of the meltable conductor 2 by the deformation suppressing electrode 5 formed on the outer peripheral side of the insulating substrate 3, and the front surface electrode 6. Further, since the insulating substrate 3 has a large amount of heat radiation from the outer peripheral side, the heat radiation property of which is more excellent than that of the central portion where the front surface electrode 6 is formed, heat from the meltable conductor 2 can be efficiently radiated by forming the deformation suppressing electrode 5 on the outer peripheral side of the insulating substrate 3.

The deformation suppressing electrode 5 is preferably formed from a plurality of small electrodes 5a provided on the outer peripheral side of the insulating substrate 3.

The deformation suppressing electrodes 5 are preferably formed on a pair of side edge sides across which the meltable conductor 2 of the insulating substrate 3 crosses. As a result, the deformation suppressing electrodes 5 are provided on both sides with respect to the front surface electrode 6, and are connected at three positions across the longitudinal direction of the meltable conductor 2, whereby the insulating substrate 3 can be surely connected. Further, by forming the deformation suppressing electrodes 5 on a pair of side edge sides across which the meltable conductor 2 of the insulating substrate 3 crosses, both sides of the insulating substrate 3 with respect to the front surface electrode 6 can be effectively prevented from fluctuating. Further, since the deformation suppressing electrodes 5 are formed on both outer peripheral sides of the insulating substrate 3 excellent in heat dissipation, heat from the meltable conductor 2 can be dissipated more efficiently.

In the case where the deformation suppressing electrodes 5 are formed on the pair of side edges of the insulating substrate 3, each deformation suppressing electrode 5 is preferably formed from a plurality of small electrodes 5a.

Here, the deformation suppressing electrode 5 or the small electrodes 5a constituting the deformation suppressing electrode 5 are preferably in a rectangular shape, the longitudinal direction of which coincides with the width direction of the meltable conductor 2. When the meltable conductor 2 melts, the melted conductor 2a of the meltable conductor 2 and the melted bonded solder aggregate on the deformation suppressing electrode 5 or the small electrodes 5a. Therefore, if the longitudinal direction of the deformation suppressing electrode 5 or the small electrodes 5a coincides with the longitudinal direction, in other words the conduction direction, of the meltable conductor 2, the melted conductor 2a aggregating on the deformation suppressing electrode 5 or the small electrodes 5a would be deposited in the longitudinal direction of the meltable conductor 2, so that the insulation resistance might be lowered.

Therefore, in the protecting device 1, by forming the deformation suppressing electrode 5 or the small electrodes 5a in a rectangular shape longitudinal direction of which coincides with the width direction of the meltable conductor 2, the melted conductor 2a of the meltable conductor 2 does not spread in the conduction direction, and the insulation resistance after fusing can be improved.

It is preferable that the deformation suppressing electrode 5 has a plurality of small electrodes 5a arranged in parallel in the width direction of the meltable conductor 2 and superposed on the meltable conductor 2. By arranging the plurality of small electrodes 5a in parallel in the width direction of the meltable conductor 2, the melted conductor 2a of the meltable conductor 2 does not spread in the conduction direction as in the above, and the insulation resistance after fusing can be improved. Further, by making each of the small electrodes 5a superposed on the meltable conductor, it is possible to improve the connection between the insulating substrate 3 and the meltable conductor 2 and heat dissipation properties.

In this case as well, in order to improve the insulation resistance, it is preferable to form each of the small electrodes 5a in a rectangular shape, the longitudinal direction of which coincides with the width direction of the meltable conductor 2.

In this case, the deformation suppressing electrode 5 may extend outward from the side edge in the width direction of the meltable conductor 2. By making the deformation suppressing electrode 5 or the small electrodes 5a superposed on the meltable conductor 2 and formed so as to extend in the width direction of the meltable conductor 2, heat from the meltable conductor 2 can be efficiently radiated from the portion not superposed on the meltable conductor 2.

Heat Radiation Electrode

Figure 6A:
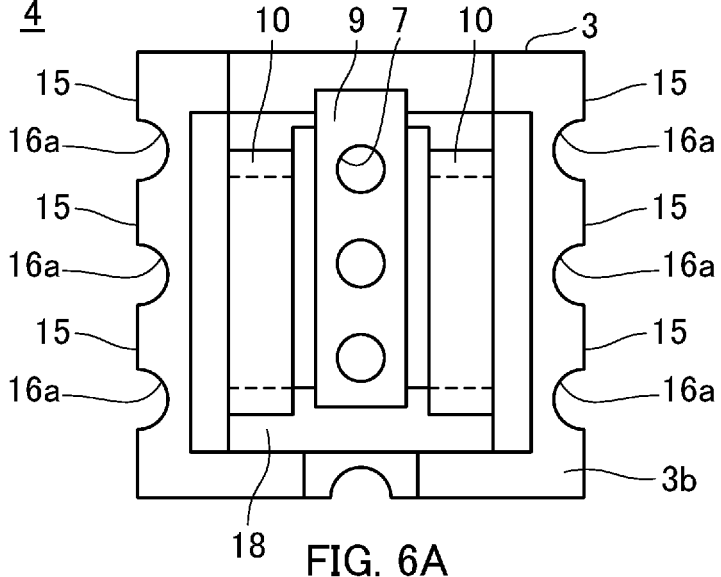
FIG. 6A is a bottom view illustrating the back surface of the insulating substrate.
Figure 6B:
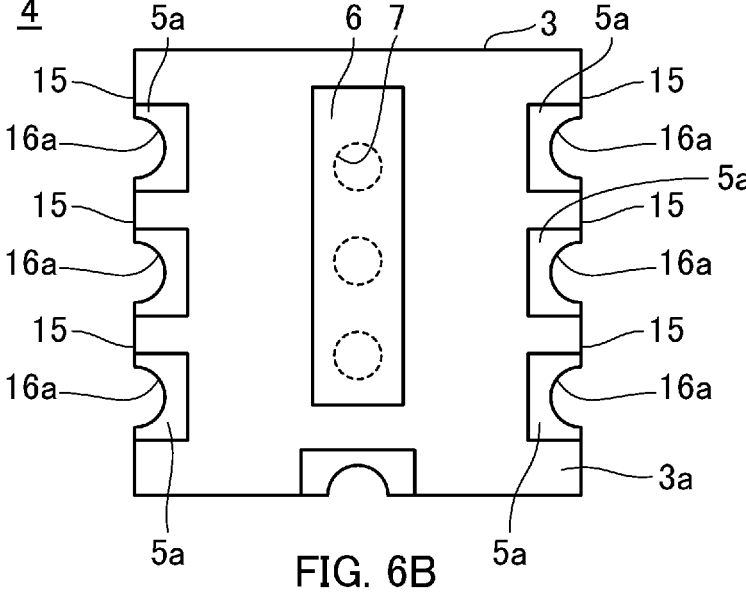
FIG. 6B is a plan view illustrating the front surface of the insulating substrate.

As shown in FIG. 6, a heat radiation electrode 15 may be connected to the deformation suppressing electrode 5 or the small electrodes 5a on the side surface of the insulating substrate 3. FIG. 6A is a bottom view illustrating the back surface 3b of the insulating substrate 3 having the heat radiation electrodes 15 formed on the side surface of the insulating substrate 3, and FIG. 6B is a plan view illustrating the front surface 3a of the insulating substrate 3 having the heat radiation electrodes 15 formed on the side surface of the insulating substrate 3. The heat radiation electrode 15 can be formed from the same material as the deformation suppressing electrode 5 or the small electrodes 5a. In this case, the deformation suppressing electrode 5 or the small electrodes 5a may have a side through hole 16a formed on the side surface of the insulating substrate 3 with a conductive layer formed from the same material as the conductive layer 8 described above. By providing the heat radiation electrode 15, the blowout member 4 can increase the heat capacity of the deformation suppressing electrode 5 or the small electrodes 5a, thereby increasing the heat radiation effect for the heat from the meltable conductor 2.

Figure 7A:
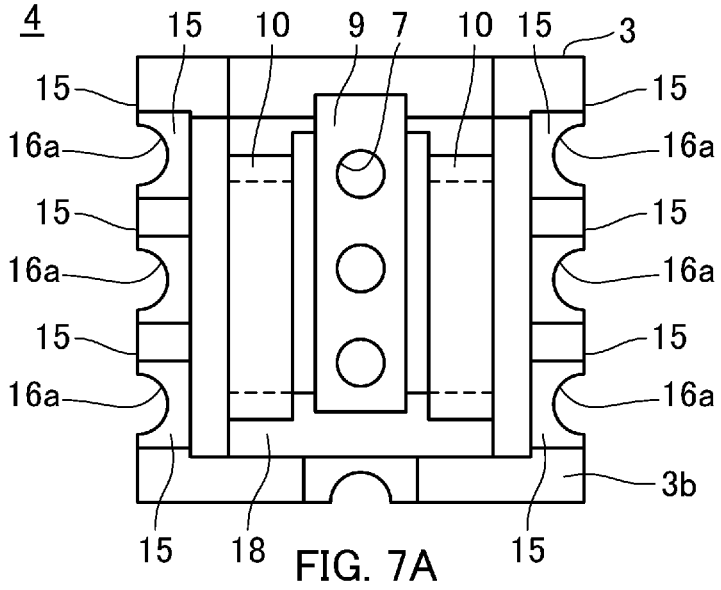
FIG. 7A is a bottom view illustrating the back surface of the insulating substrate.
Figure 7B:
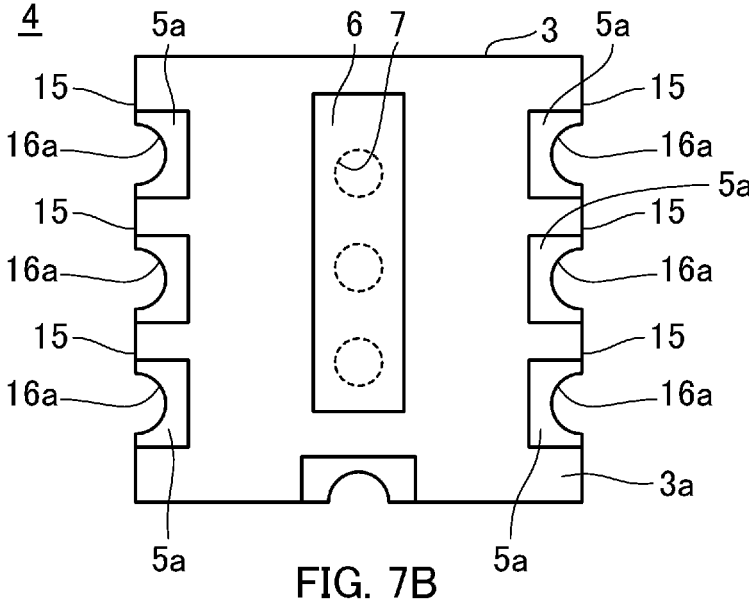
FIG. 7B is a plan view illustrating the front surface of the insulating substrate.

Further, in the blowout member 4, the heat radiation electrode 15 may be formed on the side surface and the back surface 3b of the insulating substrate 3 and may be made continuous with the deformation suppressing electrode 5 or the small electrodes 5a. FIG. 7A is a bottom view illustrating the back surface 3b of the insulating substrate 3 having the heat radiation electrodes 15 formed on the side surface and the back surface 3b of the insulating substrate 3, and FIG. 7B is a plan view illustrating the front surface 3a of the insulating substrate 3 having the heat radiation electrodes 15 formed on the side surface and the back surface 3b of the insulating substrate 3. In the blowout member 4 shown in FIGS. 7A and 7B, the heat radiation electrode 15 is formed on the side surface and the back surface 3b of the insulating substrate 3 for each small electrode 5a formed on the front surface 3a of the insulating substrate, and each small electrode 5a and each heat radiation electrode 15 are connected via a respective side through hole 16a. The side through hole 16a is provided with a conductive layer formed from the same material as the conductive layer 8 described above. As a result, the small electrodes 5a and the heat radiation electrodes 15 are thermally connected via the side through hole 16a. The blowout member 4 of this embodiment includes, in addition to the small electrode 5a, the side through hole 16a and the heat radiation electrode 15 formed on the side surface and the back surface 3b of the insulating substrate 3, thereby further increasing the heat capacity of the deformation suppressing electrode 5 and improving the heat radiation effect for the heat from the meltable conductor 2.

Figures 8A, 8B:
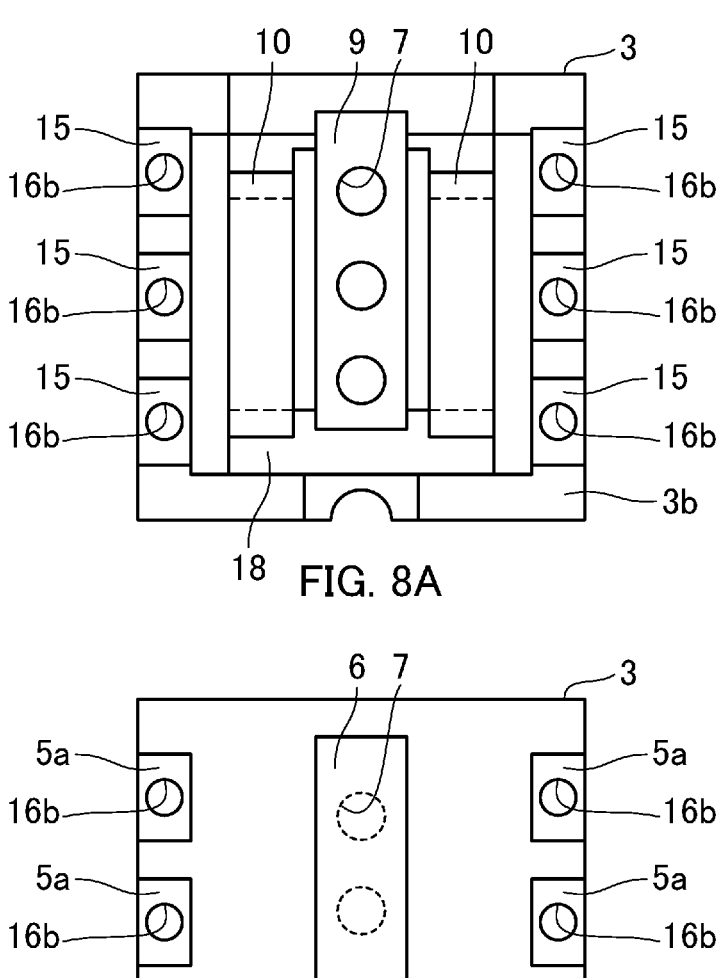
FIG. 8A is a bottom view illustrating the back surface of the insulating substrate.
FIG. 8B is a plan view illustrating the front surface of the insulating substrate.

It should be noted that the deformation suppressing electrode 5 or the small electrodes 5a and the heat radiation electrode 15 may be continuous via through holes 16b as shown in FIGS. 8A and 8B, in addition to being continuous through the side through hole 16a. FIG. 8A is a bottom view illustrating the back surface of the insulating substrate 3 on which the heat radiation electrodes 15 and the through holes 16b are formed, and FIG. 8B is a plan view illustrating the front surface of the insulating substrate 3 on which the heat radiation electrodes 15 and the through holes 16b are formed. The through hole 16b also has a conductive layer formed from the same material as the conductive layer 8 described above, whereby the small electrodes 5a and the heat radiation electrodes 15 are thermally connected via the through holes 16b. In the blowout member 4 shown in FIG. 8, the through hole 16b may or may not be filled with the conductive material constituting the conductive layer or other conductive material. In the blowout member 4 shown in FIG. 8, the heat radiation electrode 15 may or may not be provided on the side surface of the insulating substrate 3.

Figure 9A:
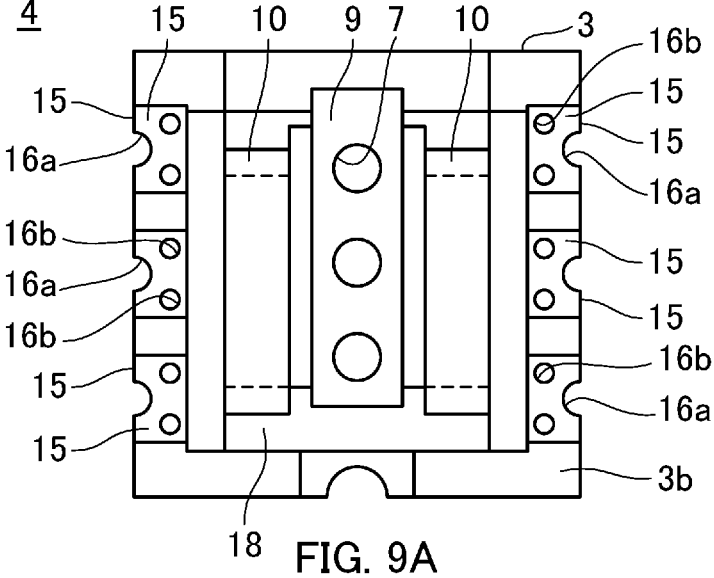
FIG. 9A is a bottom view illustrating the back surface of the insulating substrate.
Figure 9B:
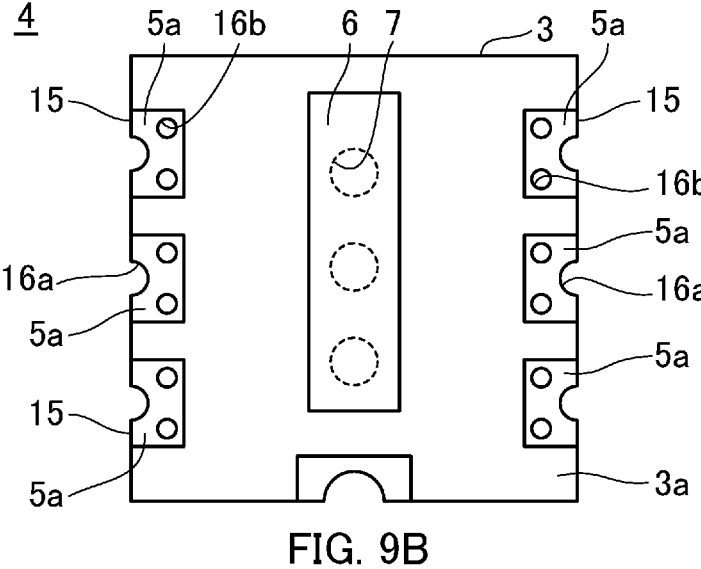

Furthermore, as shown in FIGS. 9A and 9B, the deformation suppressing electrode 5 or the small electrodes 5a and the heat radiation electrode 15 may be continuous via the side through hole 16a and the through hole 16b. FIG. 9A is a bottom view illustrating the back surface of the insulating substrate 3 on which the heat radiation electrode 15, the side through hole 16a, and the through hole 16b are formed, and FIG. 9B is a plan view illustrating the front surface of the insulating substrate 3 on which the heat radiation electrode 15, the side through hole 16a, and the through hole 16b are formed. In the blowout member 4 shown in FIG. 9, the heat radiation electrode 15 is formed on the side surface and the back surface 3b of the insulating substrate 3. In the blowout member 4 shown in FIG. 9, the through hole 16b may or may not be filled with the conductive material constituting the conductive layer or other conductive material.

Meltable Conductor

Next, the meltable conductor 2 will be explained. The meltable conductor 2 is mounted between the first and second external connection electrodes 11, 12, and melts due to heat generated by the energization of the heat-generating element 10 or due to self-heat generation (Joule heat) by the energization of a current exceeding the rating, thereby interrupting a current path between the first electrode 11 and the second electrode 12.

The meltable conductor 2 may be a conductive material which melts due to heat generation by energization of the heat-generating element 10 or an overcurrent state, and for example, BiPbSn alloy, BiPb alloy, BiSn alloy, SnPb alloy, PbIn alloy, ZnAl alloy, InSn alloy, PbAgSn alloy or the like can be used in addition to SnAgCu-based Pb-free solder.

Figure 10:
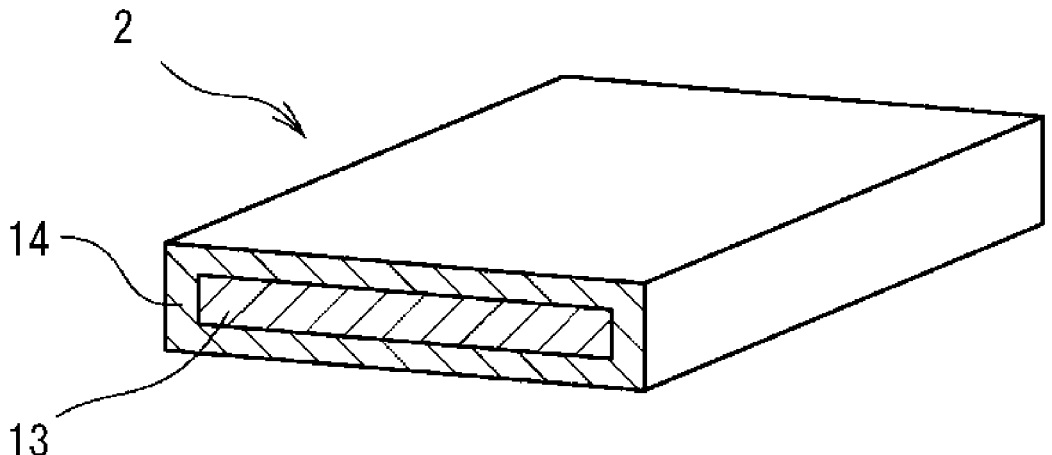
FIG. 10 is a perspective view illustrating a meltable conductor with a coating structure having a high melting point metal layer and a low melting point metal layer, wherein the low melting point metal layer is an inner layer and is coated with the high melting point metal layer.

The meltable conductor 2 may be a structure consisting of a high melting point metal and a low melting point metal. For example, as shown in FIG. 10, the meltable conductor 2 is a laminated structure consisting of an inner layer and an outer layer, and has a low melting point metal layer 13 as an inner layer and a high melting point metal layer 14 as an outer layer laminated on the low melting point metal layer 13. The meltable conductor 2 is connected to the first and second electrodes 11, 12, the front surface electrode 6, and the deformation suppressing electrode 5 through a bonding material such as a connection solder 20.

The low melting point metal layer 13 is preferably a solder or a Sn-based metal generally referred to as "Pb-free solder". The melting point of the low melting point metal layer 13 is not necessarily higher than the temperature of the reflow furnace, and may be about 200° C. The high melting point metal layer 14 is a metal layer consisting of Ag or Cu, or a metal containing any of these as a main component, laminated on the surface of the low melting point metal layer 13, and has a high melting point that does not melt even when reflow-heated for connecting the blowout member 4 and the meltable conductor 2, or for mounting the protecting device 1 on an external circuit board.

Such a meltable conductor 2 can be formed by depositing a high melting point metal layer on a low melting point metal foil using a plating technique, or can be formed using other well-known lamination techniques or film-forming techniques. In this case, the meltable conductor 2 may have a structure in which the entire surface of the low melting point metal layer 13 is covered with the high melting point metal layer 14, or may have a structure in which the low melting point metal layer 13 is covered except for a pair of opposite side surfaces. The meltable conductor 2 may be formed in various configurations, such as a structure having the high melting point metal layer 14 as an inner layer and the low melting point metal layer 13 as an outer layer, a multi-layer structure having three or more layers in which low melting point metal layers and high melting point metal layers are alternately laminated, or structure in which a part of the inner layer is exposed by providing an opening in a part of the outer layer.

By laminating the high melting point metal layer 14 as an outer layer on the low melting point metal layer 13 as an inner layer, the meltable conductor 2 is not blown even when the reflow temperature exceeds the melting temperature of the low melting point metal layer 13. As a result, connecting the blowout member 4 and the meltable conductor 2, and mounting of the protecting device 1 on the external circuit board can be efficiently performed by reflow.

Furthermore, the meltable conductor 2 is not blown by self-heating during predetermined rated current flows. When a current having a value higher than the rated value flows, the meltable conductor 2 melts due to self-heating and interrupts the current path between the first and second electrodes 11 and 12. Further, the meltable conductor 2 melts when the heat-generating element 10 is energized to generate heat, thereby interrupting the current path between the first and second electrodes 11, 12.

In this case, in the meltable conductor 2, the melted low melting point metal layer 13 erodes the high melting point metal layer 14, whereby the high melting point metal layer 14 is dissolved at a temperature lower than the melting temperature. Therefore, the meltable conductor 2 can be blown in a short time by utilizing the erosion action of the high melting point metal layer 14 by the low melting point metal layer 13. Moreover, since the melted conductor 2a of the meltable conductor 2 is separated by the physical drawing action of the front surface electrode 6, the deformation suppressing electrode 5, and the first and second electrodes 11 and 12, in addition to the suction action by the suction hole 7, the current path between the first and second electrodes 11 and 12 can be quickly and reliably interrupted.

In the meltable conductor 2, the volume of the low melting point metal layer 13 is preferably larger than that of the high melting point metal layer 14. The meltable conductor 2 is heated by self-heat generated by an overcurrent or heat generated by the heat-generating element 10, and the low melting point metal melts to erode the high melting point metal, so that the meltable conductor 2 can melt and interrupt the path quickly. Therefore, by making the volume of the low melting point metal layer 13 larger than that of the high melting point metal layer 14, the meltable conductor 2 promotes the erosion action, and can quickly shut off the path between the first and second external connection electrodes 11 and 12.

Further, since the meltable conductor 2 is constituted by laminating the high melting point metal layer 14 on the low melting point metal layer 13 serving as an inner layer, the fusing temperature can be significantly reduced as compared with a chip fuse or the like made of a conventional high melting point metal. Therefore, the meltable conductor 2 can have a larger cross-sectional area than a chip fuse or the like of the same size, and can greatly improve the current rating. Further, the meltable conductor 2 can be made smaller and thinner than a conventional chip fuse having the same current rating, and is excellent in its rapid blowout property.

In addition, the meltable conductor 2 can improve resistance (pulse resistance), in the case that an abnormally high voltage is momentarily applied to the electric system incorporating the protecting device 1. For example, the meltable conductor 2 should not blow out in the case of a current of 100 A flowing for a few milliseconds. In this regard, since a large current flowing in an extremely short time flows through the surface layer of the conductor (skin effect), and since the meltable conductor 2 is provided with a high melting point metal layer 14, such as Ag plating having a low resistivity as an outer layer, a current applied by a surge can easily be allowed to flow, and blowout due to self-heating can be prevented. Therefore, the meltable conductor 2 can significantly improve surge tolerance as compared with conventional fuses made from solder alloys.

The meltable conductor 2 may be coated with a flux (not shown) for the purpose of preventing oxidation and improving wettability during fusing. In the protecting device 1, the insulating substrate 3 is covered with a case member 17 to protect the inside thereof. As with the insulating substrate 3, the case member 17 can be formed by using an insulating member such as various engineering plastics, thermoplastic plastics, ceramics, and glass epoxy substrates, among others.

Heat-Generating Element

The heat-generating element 10 for fusing the meltable conductor 2 is a conductive member having a relatively high resistance value which generates heat when energized, and is made of, for example, nichrome, W, Mo, Ru, Cu, Ag, or an alloy containing one of these as a main component. A powdered alloy, composition, or compound of these materials may be mixed with a resin binder to obtain a paste, which is screen-printed as a pattern on the back surface 3b of the insulating substrate 3 and baked to form the heat-generating element 10.

The heat-generating element 10 is covered with an insulating layer 18 on the back surface 3b of the insulating substrate 3. The suction hole 7 on which the conductive layer 8 is formed penetrates through the insulating layer 18, and the back surface electrode 9 is laminated thereon. The insulating layer 18 is provided for protecting and insulating the heat-generating element 10 and for efficiently transmitting heat of the heat-generating element 10 to the front surface electrode 6 and the meltable conductor 2 via the conductive layer 8 and the insulating substrate 3, and is made of, for example, a glass layer. By heating the conductive layer 8 and the back surface electrode 9 by the heat-generating element 10, the melted conductor 2a of the meltable conductor 2 can be easily sucked into the suction hole 7 and easily aggregated on the back surface electrode 9. Thus, the protecting device 1 promotes the action of sucking the melted conductor 2a from the front surface electrode 6 to the back surface electrode 9 through the conductive layer 8, and can surely melt the meltable conductor 2.

One end of the heat-generating element 10 is connected to the back surface electrode 9, and is electrically connected to the meltable conductor 2 mounted on the front surface electrode 6 through the conductive layer 8 and the front surface electrode 6. The other end of the heat-generating element 10 is connected to a heat-generating element electrode not shown. The heat-generating element electrode is formed on the back surface 3b of the insulating substrate 3, is connected to a third external connection electrode 19 formed on the back surface 3b, and is connected to an external circuit via the third external connection electrode 19. By mounting the protecting device 1 on a circuit board constituting an external circuit, the heat-generating element 10 is incorporated into a power feeding path to the heat-generating element 10 formed on the circuit board via the third external connection electrode 19.

In the protecting device 1, the heat-generating element 10 may be formed inside the insulating layer 18 laminated on the back surface 3b of the insulating substrate 3. Alternatively, in the protecting device 1, the heat-generating element 10 may be formed inside the insulating substrate 3. In these cases, one end of the heat-generating element 10 is connected to the front surface electrode 6 or the back surface electrode 9, and is electrically connected to the meltable conductor 2 mounted on the front surface electrode 6. The other end of the heat-generating element 10 is connected to the third external connection electrode 19 via a heat-generating element electrode not shown.

When the heat-generating element is formed on the front surface 3a, the back surface 3b, or the inside of the insulating substrate 3, it is preferable to form the heat-generating element 10 on both sides of the suction hole 7 in order to heat the front surface electrode 6 and the back surface electrode 9 and to collect and suck more melted conductor 2a.

Circuit Configuration Example

Figure 11:
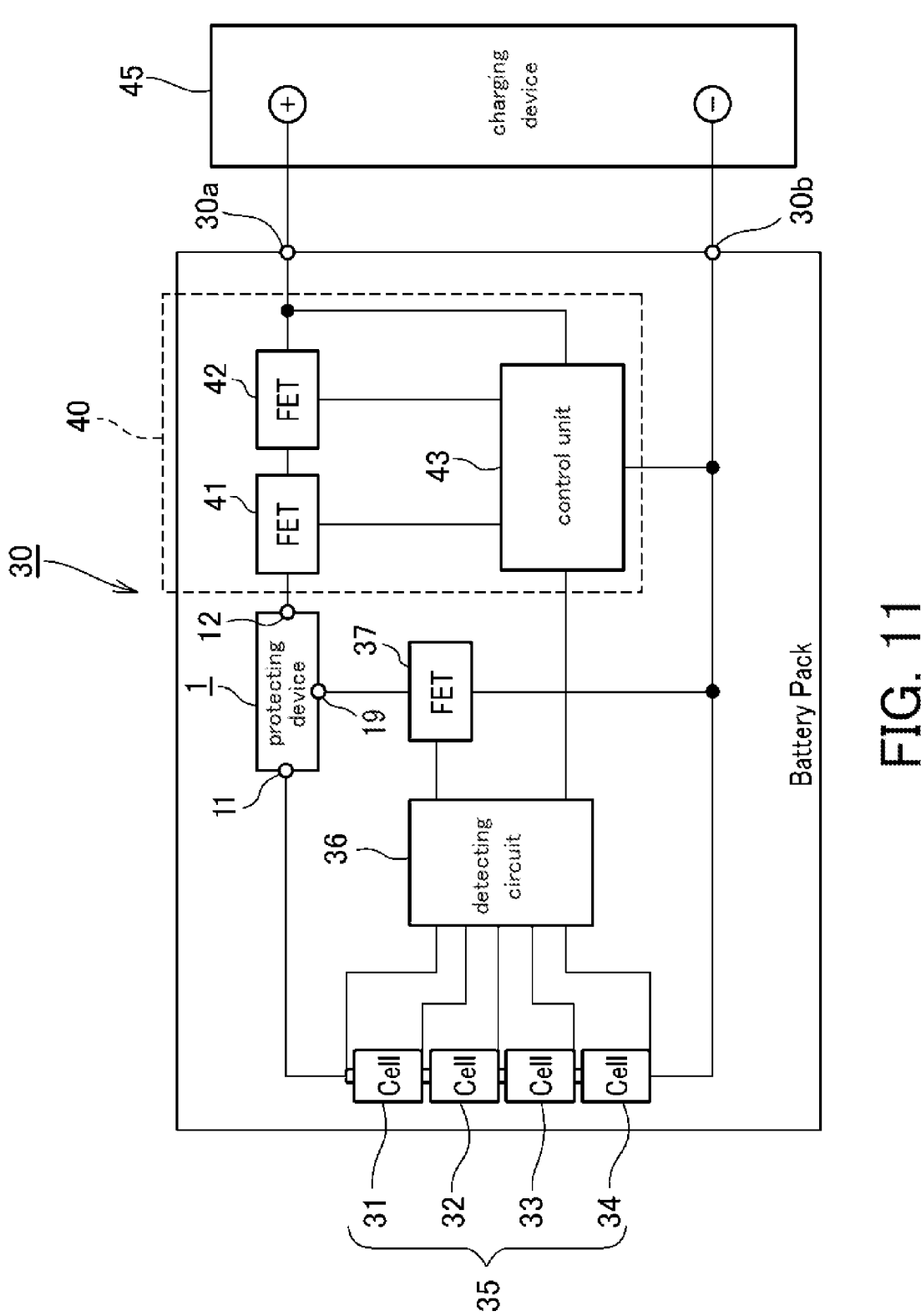
FIG. 11 is a block diagram illustrating an example of a configuration of a battery pack incorporating a protecting device.

As shown in FIG. 11, such a protecting device 1 is used, for example, in a circuit in a battery pack 30 of a lithium ion secondary battery. The battery pack 30 has a battery stack 35 comprising, for example, a total of four battery cells 31 to 34 of the lithium ion secondary battery.

The battery pack 30 includes: the battery stack 35; a charge/discharge control circuit 40 for controlling charge/discharge of the battery stack 35; the protecting device 1 according to the present technology for interrupting charge when the state of the battery stack 35 is abnormal; a detecting circuit 36 for detecting the voltage of each of the battery cells 31 to 34; and a current controlling element 37 serving as a switch element for controlling the operation of the protecting device 1 according to the detection result of the detecting circuit 36.

In the battery stack 35, the battery cells 31 to 34 requiring control for protection from over-charging and over-discharging states are connected in series, and are detachably connected to the charging device 45 via a positive electrode terminal 30a and a negative electrode terminal 30b of the battery pack 30 so as to apply a charging voltage from the charging device 45. By connecting the positive electrode terminal 30a and the negative electrode terminal 30b to a battery-driven electronic device, the battery pack 30 charged by the charging device 45 can drive the electronic device.

The charge/discharge control circuit 40 includes two current controlling elements 41, 42 connected in series in the current path between the battery stack 35 and the charging device 45, and a control unit 43 for controlling the operation of the current controlling elements 41, 42. The current controlling elements 41, 42 are formed from field effect transistors (hereinafter referred to as FETs) and the control unit 43 controls the gate voltage to switch the current path of the battery stack 35 between a conducting state and an interrupted state in the charging/discharging direction. The control unit 43 is powered by the charging device 45 and, in accordance with a detection signal from the detecting circuit 36, controls the operation of the current controlling elements 41, 42 to interrupt the current path when over-discharging or over-charging occurs in the battery stack 35.

The protecting device 1 is connected in a charge/discharge current path between the battery stack 35 and the charge/discharge control circuit 40, for example, and the operation thereof is controlled by the current controlling element 37.

The detecting circuit 36 is connected to each battery cell 31 to 34 so as to detect voltage value of each battery cell 31 to 34 and supplies each voltage value to the control unit 43 of the charge/discharge control circuit 40. Furthermore, when an over-charging voltage or over-discharging voltage is detected in one of the battery cells 31 to 34, the detecting circuit 36 outputs a control signal for controlling the current controlling element 37.

When the detection signal output from the detecting circuit 36 indicates a voltage exceeding the predetermined threshold value corresponding to over-discharging or over-charging of the battery cells 31 to 34, the current controlling element 37 formed of an FET, for example, activates the protecting device 1 to interrupt the charging/discharging current path of the battery stack 35 without the switching operation of the current controlling element 41, 42.

Figure 12:
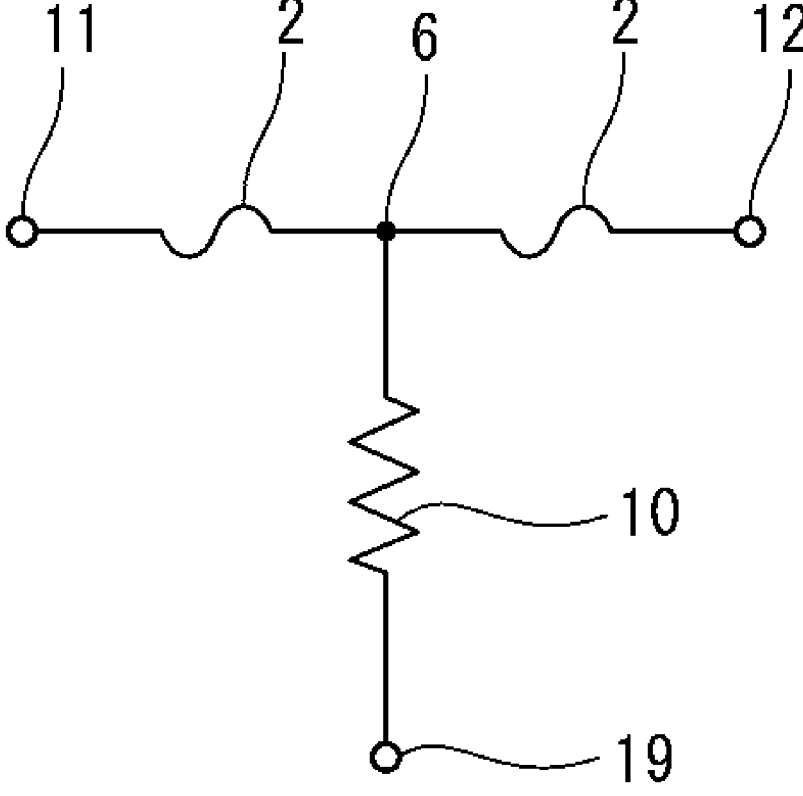
FIG. 12 is a circuit diagram of a protecting device according to the present technology.

In the battery pack 30 having the structure described above, the protecting device 1 according to the present technology has a circuit composition such as that illustrated in FIG. 12. That is, in the protecting device 1, the first external connection electrode 11 is connected to the battery stack 35 side, and the second external connection electrode 12 is connected to the positive electrode terminal 30a side, whereby the meltable conductor 2 is connected in series in the charge/discharge path of the battery stack 35. Furthermore, in the protecting device 1, the heat-generating element 10 is connected to the current controlling element 37 via the heat-generating element electrode and the third external connection electrode 19, and the heat-generating element 10 is also connected to the open end of the battery stack 35. As a result, one end of the heat-generating element 10 is connected to one open end of the meltable conductor 2 and the battery stack 35 via the front surface electrode 6, and the other end thereof is connected to the other open end of the current controlling element 37 and the battery stack 35 via the third external connection electrode 19, thereby forming a power feeding path to the heat-generating element 10 the conduction of which is controlled by the current controlling element 37.

Operation of Protecting Device

In the protecting device 1, when an overcurrent exceeding the rating flows through the battery pack 30, the meltable conductor 2 is blown by self-heating and interrupts the charge/discharge path of the battery pack 30. In this case, since the protecting device 1 is provided with the deformation suppressing electrode 5 and the front surface electrode 6 on the insulating substrate 3, the blowout portion of the meltable conductor 2 is restricted to a narrow region between the deformation suppressing electrode 5 and the front surface electrode 6. Accordingly, even when the cross-sectional area of the meltable conductor 2 is increased to cope with a large current application, the protecting device 1 can reduce the volume of the melted conductor 2a at the time of blowout, reduce scattering of the melted conductor 2a resulting from arc discharge to improve the insulation resistance, and reduce the impact applied to the insulating substrate 3 at the time of blowout to prevent destruction of the insulating substrate 3.

In the protecting device 1, when the suction hole 7 is formed in the insulating substrate 3, the melted conductor 2a is sucked into the suction hole 7 through the front surface electrode 6 by a capillary phenomenon. Therefore, even when the cross-sectional area of the meltable conductor 2 is increased to accomodate a large current application, it is possible to further reduce the volume of the melted conductor 2a at the time of blowout, improve insulation resistance, and reduce the impact on the insulating substrate. Further, in the protecting device 1, by forming the meltable conductor 2 with a high melting point metal and a low melting point metal, the low melting point metal melts before the melting of the high melting point metal, thereby blowing the meltable conductor 2 in a short amount of time.

Upon detecting an abnormal voltage of one of the battery cells 31 to 34, the detecting circuit 36 outputs an interruption signal to the current controlling element 37. Then, the current controlling element 37 controls the current so as to energize the heat-generating element 10. In the protecting device 1, the current flows from the battery stack to the heat-generating element 10 via the first external connection electrode 11, the meltable conductor 2, and the front surface electrode 6, whereby the heat-generating element 10 starts heating. In the protecting device 1, the meltable conductor 2 is blown by the heat generation of the heat-generating element 10, and the charge/discharge path of the battery stack 35 is interrupted.

In this case, since the protecting device 1 is provided with the deformation suppressing electrode 5 and the front surface electrode 6 on the insulating substrate 3, the blowout portion of the meltable conductor 2 is limited to a narrow region between the deformation suppressing electrode 5 and the front surface electrode 6, and the heat from the heat-generating element 10 is transmitted to the meltable conductor 2 via the deformation suppressing electrode 5 and the front surface electrode 6. Accordingly, even when the cross-sectional area of the meltable conductor 2 is increased in order to accommodate a large current application, the protecting device 1 can surely cut off the charge/discharge path of the battery pack 30 by concentrating heat on the blowout portion between the deformation suppressing electrode 5 and the front surface electrode 6.

In the protecting device 1, when the suction hole 7 is formed in the insulating substrate 3, the melted conductor 2a is sucked into the suction hole 7 through the front surface electrode 6 by a capillary phenomenon. Therefore, even when the cross-sectional area of the meltable conductor 2 is increased to accomodate a large current application, it is possible to further reduce the volume of the melted conductor 2a remaining on the front surface electrode 6, quickly blow the meltable conductor 2, and improve insulation resistance. The protecting device 1 can blow the meltable conductor 2 in a short amount of time by using the erosion action of the high melting point metal by the melted low melting point metal by forming the meltable conductor 2 from the high melting point metal and the low melting point metal.

In the protecting device 1, the blowout of the meltable conductor 2 also cuts off the power feeding path to the heat-generating element 10, so that the heating of the heat-generating element 10 is stopped.

In this way, in the protecting device 1, the meltable conductor 2 is blown by the self-heating of the meltable conductor 2 by the overcurrent or by the heating via the energization of the heat-generating element 10. In this case, in the protecting device 1, even when reflow mounting or even when the circuit board on which the protecting device 1 is mounted is subjected to a high temperature environment, such as reflow heating, the heat from the meltable conductor 2 is radiated by the deformation suppressing electrode 5; and the deformation suppressing electrode 5 composed of a plurality of narrowed small electrodes 5a is formed on the insulating substrate 3 to limit the floating region of the connection solder 20 for connection with the meltable conductor 2, so that the blowout member 4 is stably held and the deformation of the meltable conductor 2 is suppressed. Therefore, it is possible to suppress variation in the blowout properties caused by variation in the resistance value or the like resulting from deformation of the meltable conductor 2, and thereby quickly blowout the meltable conductor 2 by the predetermined overcurrent or the heat generation of the heat-generating element 10.

The protecting device 1 according to the present invention is not limited to usage in battery packs of a lithium ion secondary battery, but may be applied to any other application requiring interruption of a current path by an electric signal.

Second Embodiment

Figure 14:
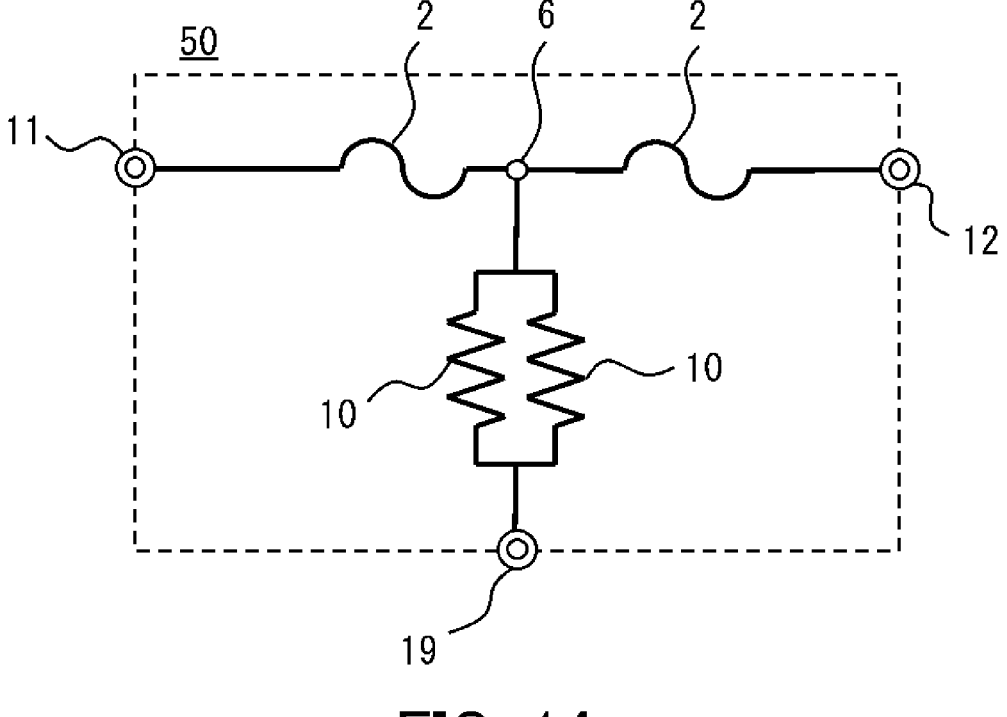
FIG. 14 is a circuit diagram illustrating the protecting device having a plurality of blowout members shown in FIG. 13.

Next, a second embodiment of a protecting device according to the present technology will be described with reference to FIG. 13. In the following description, the same reference numerals as those of the protecting device 1 are denoted by the same reference numerals and their details are omitted. In the protecting device 50 shown in FIGS. 13A and 13B, the blowout member 4 described above is disposed on one surface and the other surface of the meltable conductor 2, respectively. FIG. 14 is a circuit diagram of the protecting device 50. In each of the blowout members 4 disposed on the front and back surfaces, one end of the heat-generating element 10 is connected to the meltable conductor 2 via the front surface electrode 6 formed on each insulating substrate 3, and the other end of the heat-generating element 10 is connected to a power source for generating heat of the heat-generating element 10 via the third external connection electrode 19 formed on each insulating substrate 3.

In the blowout members 4 of the protecting device 50, respectively connected to one surface and the other surface of the meltable conductor 2 through the connection solder 20, the deformation suppressing electrode 5 is connected to the insulating substrate 3. Accordingly, even when exposed to a high temperature environment, such as reflow heating, when connected to the meltable conductor 2, or when the protecting device 1 is mounted on an external circuit board, the blowout member 4 radiates heat from the meltable conductor 2 to the insulating substrate 3 side, thereby preventing deformation of the meltable conductor 2 that would result from heat accumulation.

In addition, the deformation suppressing electrode 5 limits the floating region of the connection solder 20 softened to a liquid state by heating when exposed to a high temperature environment, such as reflow mounting. Thus, it is possible to prevent the respective insulating substrates 3 from fluctuating and the meltable conductor 2 from being deformed due to the floating of the softened connection solder.

Figure 15:
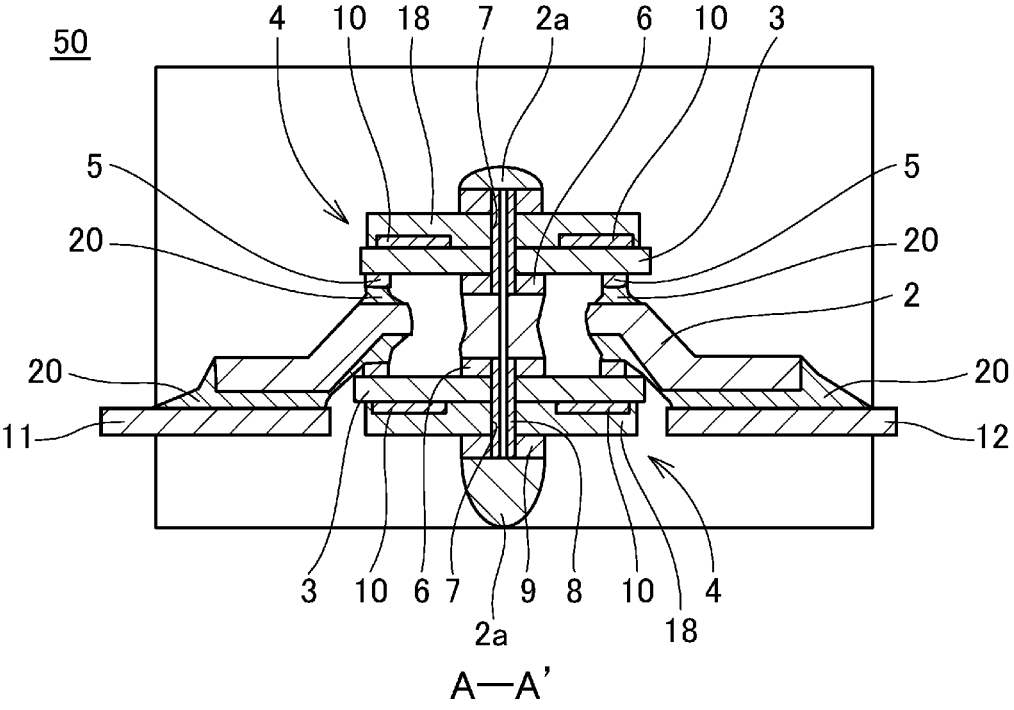
FIG. 15 is a cross-sectional view of the protecting device according to the present technology shown in FIG. 13 showing a state in which the meltable conductor is blown.
Figure 17:
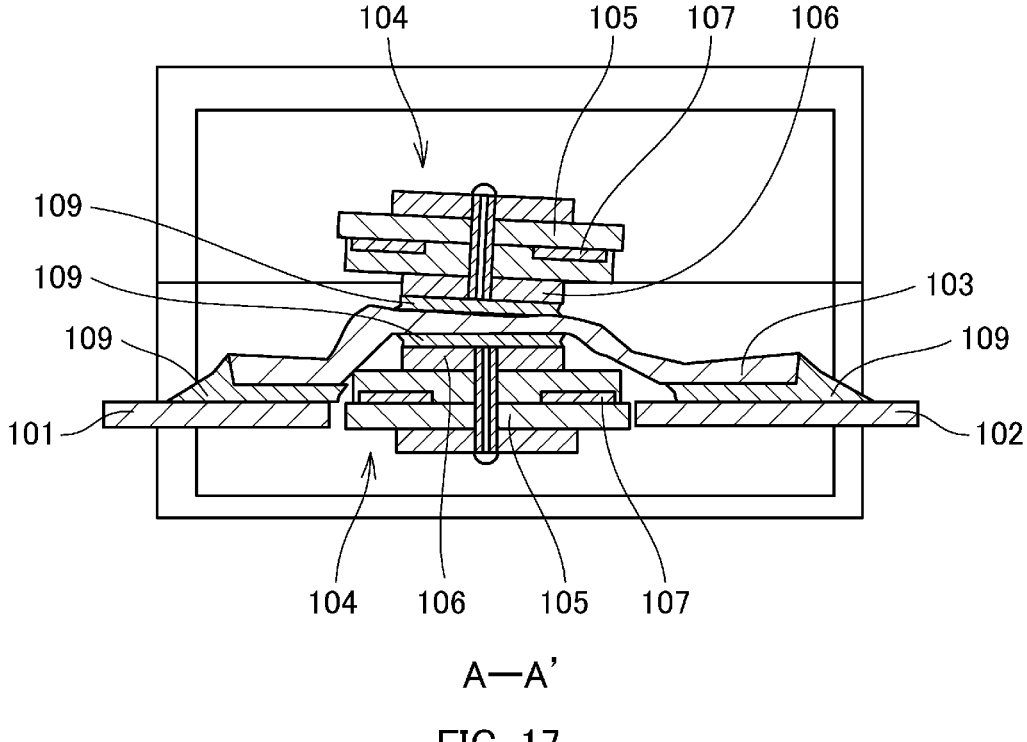
FIG. 17 is a cross-sectional view of the protecting device of FIG. 16 showing a state in which the meltable conductor is deformed.

As shown in FIG. 15, in the protecting device 50, when the meltable conductor 2 is blown by the heat generation of the heat-generating element 10, the heat-generating elements 10 of the blowout members 4, 4 connected to both surfaces of the meltable conductor 2 generate heat and the meltable conductor 2 is heated from both surfaces. Accordingly, even when the cross-sectional area of the meltable conductor 2 is increased to accomodate a large current application, the protecting device 50 can quickly heat and blow the meltable conductor 2.

Furthermore, in the protecting device 50, when the suction hole 7 is formed in the insulating substrate 3 of each blowout member 4, the melted conductor 2*a* is sucked from both sides of the meltable conductor 2 into each through hole 58. Accordingly, even when the cross-sectional area of the meltable conductor 2 is increased in order to accomodate a large current application and a large amount of the melted conductor 2*a* is generated, the protecting device 50 can suck the melted conductor 2*a* by the plurality of blowout members 4, thereby surely blowing the meltable conductor 2. The protecting device 50 sucks the melted conductor 2*a* with the plurality of blowout members 4, thereby blowing the meltable conductor 2 more quickly.

The protecting device 50 can quickly blow the meltable conductor 2 even when a coating structure in which a low melting point metal constituting an inner layer is coated with a high melting point metal is used as the meltable conductor 2. That is, when the heat-generating element 10 generates heat, it takes time for the meltable conductor 2 coated with the high melting point metal to be heated to a temperature at which the high melting point metal of the outer layer melts. Here, the protecting device 50 is provided with a plurality of blowout members 4, and each heat-generating element 10 simultaneously generates heat to rapidly increase the temperature of the high melting point metal of the outer layer to the melting temperature. Therefore, according to the protecting device 50, the thickness of the high melting point metal layer constituting the outer layer can be increased, and the rapid blowout properties can be maintained while achieving further high rating.

In addition, as shown in FIG. 14, the protecting device 50 is preferably connected to the meltable conductor 2 with the pair of blowout members 4, 4 facing each other. As a result, the protecting device 50 can simultaneously heat the same portion of the meltable conductor 2 from both sides and suck the melted conductor 2*a* by the pair of blowout members 4, 4, so that the meltable conductor 2 can be heated and blown more quickly.

In this case, in the protecting device 50, the deformation suppressing electrodes 5 formed on the insulating substrates 3 of the pair of blowout members 4, 4 are preferably opposed to each other via the meltable conductor 2. Thus, it is possible to promote the heat radiation at the connection position with the insulating substrate 3 to suppress the softening of the meltable conductor 2, and to improve the resistance to deformation caused by the fluctuation of the blowout member 4. By connecting the pair of blowout members 4 symmetrically, the load applied to the meltable conductor 2 is not unbalanced, and resistance to deformation can be improved.

DESCRIPTION OF REFERENCE CHARACTERS

1 protecting device, 2 meltable conductor, 3 insulating substrate, 4 blowout member, 5 deformation suppressing electrode, 6 front surface electrode, 7 suction hole, 8 conductive layer, 9 back surface electrode, 10 heat-generating element, 11 first external connection electrode, 12 second external connection electrode, 13 low melting point metal layer, 14 high melting point metal layer, 17 case member, 18 insulating layer, 19 third external connection electrode, 20 connection solder, 30 battery pack, 30*a* positive electrode terminal, 30*b* negative electrode terminal, 31 to 34 battery cell, 35 battery stack, 36 detecting circuit, 37 current controlling element, 40 charge/discharge control circuit, 41, 42 current controlling element, 43 control unit, 45 charging device, 50 protecting device

What is claimed is:

1. A protecting device, comprising:
   a meltable conductor; and
   a blowout member connected to one surface of the meltable conductor,
   wherein the blowout member comprises an insulating substrate and plurality of deformation suppressing electrodes formed on a front surface of the blowout member,
   wherein the insulating substrate and the deformation suppressing electrodes are connected to the meltable conductor and thereby provide for suppression of deformation of the meltable conductor,
   wherein each deformation suppressing electrode comprises a plurality of small electrodes at a connection portion with the meltable conductor,
   wherein each side of the meltable conductor is attached to a respective deformation suppressing electrode via the plurality of small electrodes on each side of the meltable conductor, and
   wherein the plurality of deformation suppression electrodes are configured to suppress deformation in the meltable conductor before the meltable conductor melts.

2. The protecting device according to claim 1,
   wherein the meltable conductor is mounted over a pair of opposite side edges of the front surface of the insulating substrate, and
   wherein the deformation suppressing electrodes are formed on an outer peripheral side of the insulating substrate.

3. The protecting device according to claim 2, wherein the deformation suppressing electrodes are formed on the pair of side edges of the insulating substrate.

4. The protecting device according to claim 2, wherein the deformation suppressing electrodes are formed in a rectangular shape a longitudinal direction of which coincides with a width direction of the meltable conductor.

5. The protecting device according to claim 1, wherein the plurality of small electrodes are arranged in parallel in a width direction of the meltable conductor and superposed on the meltable conductor.

6. The protecting device according to claim 1 wherein the deformation suppressing electrodes extend outward from a side edge in a width direction of the meltable conductor.

7. The protecting device according to claim 1, further comprising:

a heat-generating element formed on the insulating substrate to melt the meltable conductor;

a front surface electrode formed on the front surface of the insulating substrate and connected to the heat-generating element and the meltable conductor; and a heat-generating element electrode formed on the insulating substrate and connected to an external power supply for supplying power to the heat-generating element.

8. The protecting device according to claim 7, wherein the front surface electrode is provided with a suction hole for sucking the melted meltable conductor, and wherein the suction hole is a through hole or a non-through hole formed in a thickness direction of the insulating substrate and a conductive layer connected to the front surface electrode is formed on an inner surface of the suction hole.

9. The protecting device according to claim 8, wherein the suction hole is a through hole, and wherein a back surface of the insulating substrate is provided with a back surface electrode connected to the conductive layer.

10. The protecting device according to claim 1, further comprising:

a first external connection electrode; and a second external connection electrode, wherein the meltable conductor is connected between the first external connection electrode and the second external connection electrode, and wherein a current path between the first external connection electrode and the second external connection electrode is interrupted by melting the meltable conductor.

\* \* \* \* \*